United States Patent
Hoehse

(10) Patent No.: US 12,019,024 B2
(45) Date of Patent: Jun. 25, 2024

(54) METHOD AND DEVICE ASSEMBLY FOR PREDICTING A PARAMETER IN A BIOPROCESS BASED ON RAMAN SPECTROSCOPY AND METHOD AND DEVICE ASSEMBLY FOR CONTROLLING A BIOPROCESS

(71) Applicant: SARTORIUS STEDIM DATA ANALYTICS AB, Umeå (SE)

(72) Inventor: Marek Hoehse, Goettingen (DE)

(73) Assignee: SARTORIUS STEDIM DATA ANALYTICS AB (SE)

(*) Notice: Subject to any disclaimer, the term of this patent is extended or adjusted under 35 U.S.C. 154(b) by 217 days.

(21) Appl. No.: 17/776,724

(22) PCT Filed: Nov. 12, 2020

(86) PCT No.: PCT/EP2020/081966
§ 371 (c)(1),
(2) Date: May 13, 2022

(87) PCT Pub. No.: WO2021/094488
PCT Pub. Date: May 20, 2021

(65) Prior Publication Data
US 2022/0381696 A1  Dec. 1, 2022

(30) Foreign Application Priority Data
Nov. 15, 2019 (EP) .................... 19209535

(51) Int. Cl.
*G01J 3/44* (2006.01)
*G01N 21/65* (2006.01)

(52) U.S. Cl.
CPC ............... *G01N 21/65* (2013.01); *G01J 3/44* (2013.01); *G01N 2201/121* (2013.01)

(58) Field of Classification Search
CPC ............ G01N 21/65; G01N 2201/121; G01N 2201/129; G01J 3/44; A61B 5/0075
See application file for complete search history.

(56) References Cited

U.S. PATENT DOCUMENTS

| 5,697,373 A | 12/1997 | Richards-Kortum et al. |
| 2005/0171436 A1* | 8/2005 | Clarke ................ A61B 5/0084 600/478 |

(Continued)

FOREIGN PATENT DOCUMENTS

| CN | 104136908 A | 11/2014 |
| CN | 104777149 A | 7/2015 |

(Continued)

OTHER PUBLICATIONS

Sabrina Metze et al.: "Multivariate data analysis of capacitance frequency scanning for online monitoring of viable cell concentrations in smallscale bioreactors", Coresta PTM Technical Report, Oct. 13, 2019, pp. 1-14.

(Continued)

*Primary Examiner* — Abdullahi Nur
(74) *Attorney, Agent, or Firm* — Dilworth IP, LLC

(57) ABSTRACT

A method of predicting a parameter of a medium to be observed in a bioprocess based on Raman spectroscopy including the steps of acquiring a first series of preparatory Raman spectra of an aqueous medium using a first measuring assembly; normalizing the first series of preparatory Raman spectra based on a characteristic band of water from at least one Raman spectrum acquired with the first measuring assembly; building a multivariate model for the parameter based on the normalized preparatory Raman spectra; acquiring predictive Raman spectra of the medium to be observed during the bioprocess with another measuring assembly; normalizing the predictive Raman spectra based on a characteristic band of water from at least one Raman spectrum (Continued)

spectrum acquired with the other measuring assembly; and applying the built model to the predictive Raman spectra for predicting the parameter.

29 Claims, 5 Drawing Sheets

(56) References Cited

U.S. PATENT DOCUMENTS

| | | |
|---|---|---|
| 2014/0377795 A1 | 12/2014 | Gannot et al. |
| 2016/0130725 A1 | 5/2016 | Xu et al. |
| 2017/0130186 A1* | 5/2017 | Berry .................... C12M 41/48 |
| 2018/0291329 A1 | 10/2018 | Moretto et al. |
| 2019/0112569 A1 | 4/2019 | Czeterko et al. |

FOREIGN PATENT DOCUMENTS

| | | |
|---|---|---|
| CN | 106932378 A | 7/2017 |
| CN | 108802000 A | 11/2018 |
| CN | 108802002 A | 11/2018 |
| CN | 109477052 A | 3/2019 |
| EP | 0765134 B1 | 4/1997 |
| WO | 2016073233 A1 | 5/2016 |
| WO | 2017207822 A1 | 12/2017 |

OTHER PUBLICATIONS

Aaltonen et al.: "In-line monitoring of solid-state transitions during fluidization", Chemical Engineering Science, Oxford, GB, vol. 62, No. 1-2, Nov. 18, 2006, p. 408-415.

Jens A. Iversen et al.: "Quantitative monitoring of yeast fermentation using Raman spectroscopy", Research Paper, Anal Bioanal Chem, May 2014, Springer Verlag, DE; pp. 4911-4949.

International Search Report Issued in International Application No. PCT/EP2020/081966, issued Jan. 25, 2021, 3 pages.

IPRP and Written Opinion of the International Searching Authority Issued in International Application No. PCT/EP2020/081966, issued May 27, 2022, 9 pages.

* cited by examiner

METHOD AND DEVICE ASSEMBLY FOR PREDICTING A PARAMETER IN A BIOPROCESS BASED ON RAMAN SPECTROSCOPY AND METHOD AND DEVICE ASSEMBLY FOR CONTROLLING A BIOPROCESS

FIELD OF THE INVENTION

The invention relates to a method of predicting a parameter in a bioprocess based on Raman spectroscopy. The invention further relates to a device assembly for predicting a parameter of a medium to be observed in a bioprocess. The invention further relates to a method of controlling a bioprocess. The invention further relates to a device assembly for controlling a bioprocess.

BACKGROUND OF THE INVENTION

Raman spectroscopy is increasingly used to control bioprocesses. Devices used in the bioprocess for acquiring Raman spectra usually include a spectrometer and an optical probe, especially a fiber optic probe. For an evaluation of the Raman spectra, a model has to be built that takes certain process variations into account.

Ambient light can have a negative influence on the quality of the Raman spectra. Especially fluorescent tubes or energy-saving lamps show undesirable characteristic bands in the Raman spectrum. Therefore, Raman spectroscopy is mostly used in small glass vessels, which are completely shielded against ambient light by aluminum foil during cultivation. With large-scale single-use bioreactors (as used for commercial production processes), this is not easily possible due to the size of the reactors and the materials used. For example, foil bags with openings at the top and at the sides (for sensor access) cannot be easily wrapped in aluminum foil.

In known bioprocess measurement systems based on Raman spectroscopy a "dark" Raman spectrum is acquired (with the laser of the optical probe switched off) once before a batch is processed. The dark Raman spectrum is used to correct influences of ambient light, if necessary. However, this correction fails in case the intensity of the ambient light changes compared to the single dark measurement while the batch is processed.

Moreover, the differences in the hardware used for the Raman spectroscopy measurements make it particularly difficult to obtain a correct prediction of certain parameters or characteristics of the medium (e.g. glucose concentration/content) based on the acquired Raman spectra, and they have a negative influence on the prediction error. The main reasons are the different light throughputs of the individual fiber probes and the undesired variability in the optical connection of the probes. Furthermore, in case of non-immersion probes, variations of the optical interface to the process have to be taken into account.

It is to be noted that currently the differences in the light throughput of the optical probes are not corrected resolutely. Mostly they are not even considered as a cause for increased model errors. The classical data pre-processing of Raman spectra (e.g. scattering corrections such as standard normal variate transformation (SNVT) and derivatives) reduces the influence of probe differences in the best case, but at the same time impairs the signal-to-noise ratio. Currently, the remaining differences are usually simply accepted.

By measuring a Raman spectrum of a calibration substance (a standard solution), it would be possible to determine the probe differences and normalize the spectral intensities. The complete optics would have to be included in this determination. With such an approach, the different intensities would be leveled when measuring the same sample and the optics would only cause slightly different noise components in the Raman spectra. While this would be a practicable way for re-usable systems, the method would fail when the spectroscopy interface for optically connecting the probe to the medium is integrated in large-scale single-use vessels. It is not possible to first acquire Raman spectra of e.g. 1000 L of a standard solution in a single-use bioreactor before acquiring Raman spectra of the medium to be observed in the actual bioprocess since the same single-use bioreactor cannot be used twice. Consequently, in a single-use system any calibration or normalization has to be done with the actual cell culture medium.

In the publication "Quantitative monitoring of yeast fermentation using Raman spectroscopy" by Jens A. Iverson et al. in Analytical and Bioanalytical Chemistry, August 2014, Volume 406, Issue 20, pp 4911-4919, a correction including the water band is mentioned. According to the publication, the water band is used as internal standard and the cell concentration is calculated based on this internal standard. It is to be noted that the result is not normalized to the water band (in this case the function as internal standard would no longer be given). Rather, the extinctions of the Raman intensities are corrected only according to the obtained cell concentration, i.e. this correction only aims at the differences in the cell number (which is evident from the fact that the data was only recorded using a single device or probe). A transfer of models between different assemblies is not addressed in the publication.

SUMMARY OF THE INVENTION

It is an object of the invention to enable a more precise prediction of a parameter of a medium to be observed in a bioprocess based on Raman spectroscopy. In particular, the invention aims at eliminating undesired variations caused by differences in the optical hardware used for acquiring the Raman spectra.

The above problem is solved by a method according to claim 1. Advantageous and expedient embodiments of the invention are apparent from the corresponding dependent claims.

The invention provides a method of predicting a parameter of a medium to be observed in a bioprocess based on Raman spectroscopy. The method according to the invention comprises the steps of: acquiring a first series of preparatory Raman spectra of an aqueous medium using a first measuring assembly; normalizing the first series of preparatory Raman spectra based on a characteristic band of water from at least one Raman spectrum acquired with the first measuring assembly; building a multivariate model for the parameter based on the normalized preparatory Raman spectra; acquiring predictive Raman spectra of the medium to be observed during the bioprocess with another measuring assembly; normalizing the predictive Raman spectra based on a characteristic band of water from at least one Raman spectrum acquired with the other measuring assembly; and applying the built model to the predictive Raman spectra for predicting the parameter.

It is to be noted that hereinafter the term "acquired" in connection with a Raman spectrum may refer to a Raman spectrum that has already undergone a dark current correction and/or a baseline correction as commonly known, but not a normalization in accordance with the present invention.

The invention is based on the finding that in a Raman spectrum the intensity (peak value at a certain wavelength) or the integral (area underneath a peak in a defined wavelength range) of a characteristic water band is in direct proportion to the light throughput of the hardware that is used for measuring the Raman spectrum (hereinafter called "measuring assembly"). Since water is always present in any medium of an upstream process, this relationship can be used to significantly reduce or even eliminate the influence of unwanted variations on the Raman spectra caused by (i) different light throughputs of different measuring assemblies (which include respective optical interfaces to single-use bioreactors) and/or (ii) different media opacities and/or (iii) different focal points. It is also possible to correct shadowing effects caused by cells.

In a nutshell, the before-mentioned relationship regarding the hardware-caused differences in the acquired Raman spectra can be put as follows: If a first measuring assembly is less sensitive to an analyte than a second measuring assembly and thus produces a weaker signal of the analyte, then the signal of the characteristic water band produced by the first measuring assembly is equally weaker than the corresponding signal produced by the second measuring assembly. Therefore, a normalization of each Raman spectrum based on the characteristic water band from a Raman spectrum acquired with the same measuring assembly, respectively, levels the different sensitivities of the different measuring assemblies.

The invention also facilitates the cross-scale application of the technique as well as the model transfer between different process scalings. Thus, the invention optimizes the use of Raman spectroscopy in cell cultivation.

Preferably, the characteristic water band at about 1640 $cm^{-1}$ is used for normalizing the preparatory and/or predictive Raman spectra. Compared to other characteristic water bands, such as the band at between 2950 $cm^{-1}$ and 3600 $cm^{-1}$, the characteristic water band at about 1640 $cm^{-1}$ yields the best results in view of noise and potential overlaying effects.

It is to be noted that "normalizing" a Raman spectrum in the sense of the invention means that each wavelength of the Raman spectrum is treated with a correction factor. This correction factor can be based on a peak value (band intensity) and/or a peak area (integral) of the characteristic water band. In particular, the intensity of a specific wavelength and/or an area (integral) underneath the characteristic water band in a defined wavelength range can be defined as 1. The correction factor corresponds to the difference between an original Raman spectrum and a Raman spectrum where the certain feature is set to 1. Accordingly, what is changed is the overall intensity of the spectrum while the shape and other characteristics remain unchanged.

Of course, building the multivariate model is not limited to normalized preparatory Raman spectra of only one measurement assembly. On the contrary, the invention is especially advantageous in use cases where more than one bioreactor and more than one measurement assembly are used to build the multivariate model. In these cases also (at least) a second series of preparatory Raman spectra of an aqueous medium are acquired using a second measuring assembly. Accordingly, the second series of preparatory Raman spectra is normalized based on the characteristic band of water from at least one Raman spectrum acquired with the second measuring assembly. The method can be scaled up to any plurality of measuring assemblies. The multivariate model for the parameter is then based on the normalized first and second (and any further) series of preparatory Raman spectra.

According to a first approach, each of the preparatory and/or predictive Raman spectra is normalized using the characteristic water band from the very same Raman spectrum, respectively. This approach generally leads to well acceptable results in cell cultivations as it also accounts for variations in opacity caused by the increasing number of cells in the course of the cultivation (when the irradiance at the focal point is reduced due to scattering at cells between the measuring assembly and the focal point. On the other hand, the spectrum quality (signal-to-noise ratio) usually deteriorates in the course of the cultivation due to the increasing number of cells.

According to a second approach, each spectrum of a series of preparatory and/or predictive Raman spectra acquired with one measuring assembly is normalized using a statistical average, especially a median or a mean value, of the characteristic water band derived from the same or another series of Raman spectra acquired with the same measuring assembly. This approach simplifies the normalization procedures as the same statistical average can be used for a series of Raman spectra acquired with the same measuring assembly. For example, one average data set can be applied to all Raman spectra acquired from one batch in the bioprocess. The advantage of this approach is that the normalization data for all Raman spectra of a series can be determined at a time when the signal-to-noise ratio is optimal, especially at the start of the cultivation, possibly even before inoculation in the pure medium. The same normalization data is then applied to all Raman spectra of the series for normalization.

In most cases the bioprocess is run with an equipment different from the experimental set-up with which the multivariate model was built. This means that the predictive Raman spectra of the medium to be observed during the bioprocess are acquired with a measuring assembly which is different from the measuring assemblies used for acquiring the preparatory Raman spectra.

Typically, several small-scale bioreactors, preferably arranged in a multi-parallel set-up, with one or more measuring assemblies are used for modelling, while a large-scale bioreactor with a different measuring assembly, typically a single-use bioreactor having an inherent spectroscopy port, is used for the bioprocess in which the model is to be applied. The spectroscopy port provides an optical interface and may be welded to the bag foil, for example.

In order to build a robust quantitative model for the parameter, it is expedient to take a sample of the aqueous medium, perform a sample reference measurement of the parameter, and link at least one of the preparatory Raman spectra to the sample reference measurement, preferably a preparatory Raman spectrum acquired at the same time as the sample was taken. The sample reference measurement can be performed immediately after sampling. The sample can also be cooled or frozen between sampling and later reference measurement to avoid or minimize further metabolization.

For building a qualitative model a statistical value from the preparatory Raman spectra can be derived, in particular score values from a principal component analysis (PCA) or an (orthogonal) partial least squares ((O)PLS) regression.

The invention also provides a device assembly for predicting a parameter of a medium to be observed in a bioprocess. The device assembly is adapted to carry out the method of predicting a parameter according to the invention.

According to a preferred set-up for performing the initial experiments required for building a suitable model, the device assembly comprises a plurality of small-scale bioreactors containing aqueous media from which the preparatory Raman spectra are acquired. The small-scale bioreactors are preferably automated and arranged in a multi-parallel set-up. Such a set-up enables high throughput and variations of process conditions, like pH, dissolved oxygen (dO), inoculation seed density, glucose setpoints, temperature etc, thus allowing for fast and robust model building.

When the preparatory Raman spectra for building the multivariate model are obtained from a plurality of small-scale bioreactors, the following variants are possible:

According to a first variant, each small-scale bioreactor is equipped with an individual measuring assembly for acquiring the preparatory Raman spectra. This means that the preparatory Raman spectra are acquired in the bioreactors by the respective different measuring assemblies.

According to a second variant, each small-scale bioreactor is connectable to a single measuring assembly for acquiring the preparatory Raman spectra. This means that only one measuring assembly is used, e.g. a flow cell, for acquiring the preparatory Raman spectra. While the second variant may require more time as the preparatory Raman spectra have to be recorded sequentially, the normalization procedures are simplified since only one measuring assembly is used.

For running the bioprocess in which the built model is to be applied, e.g. a large-scale manufacturing bioprocess, typically a large-scale single-use bioreactor having an inherent spectroscopy port for acquiring the predictive Raman spectra is used. Since the influence of the inherent spectroscopy port on the sensitivity of the measuring assembly can be reduced or even eliminated, application of the model built according to the invention leads to improved results, even when a new bioreactor with a new spectroscopy port is used for each batch.

The device assembly according to the invention preferably includes a Multivariate Data Analysis software module for building the multivariate model and applying the multivariate model in real-time. Further, the device assembly may include a control software module for controlling a spectrometer of the measuring assembly used for acquiring the predictive Raman spectra during the bioprocess. The software modules can be provided as separate "plug-in" solutions which communicate with other software components of the device assembly via appropriate software interfaces. On the other hand, the software modules may be combined and/or integrated in other software components of the device assembly.

The invention further provides a method of controlling a bioprocess, comprising the steps of: predicting a parameter of a medium to be observed in the bioprocess by a method defined above; and modifying at least one process parameter of the bioprocess based on the prediction in real-time; and/or initiating a control action based on the prediction in real-time.

For example, the control unit may initiate a control action like controlling a feed supply; adding an antifoam or taking a sample (sampling).

The invention further provides a device assembly for controlling a bioprocess. The device assembly for controlling a bioprocess is adapted to carry out a method of controlling a bioprocess according to the invention.

The device assembly may comprise a device assembly for predicting a parameter defined above, and a control unit connected to the control software module and the Multivariate Data Analysis software module. The control unit is adapted to modify at least one process parameter of the bioprocess based on the prediction in real-time and/or to initiate a control action based on the prediction in real-time.

BRIEF DESCRIPTION OF THE DRAWINGS

Further features and advantages of the invention will become apparent from the following description and from the accompanying drawings to which reference is made. In the drawings.

DETAILED DESCRIPTION OF THE INVENTION

Figure 1:
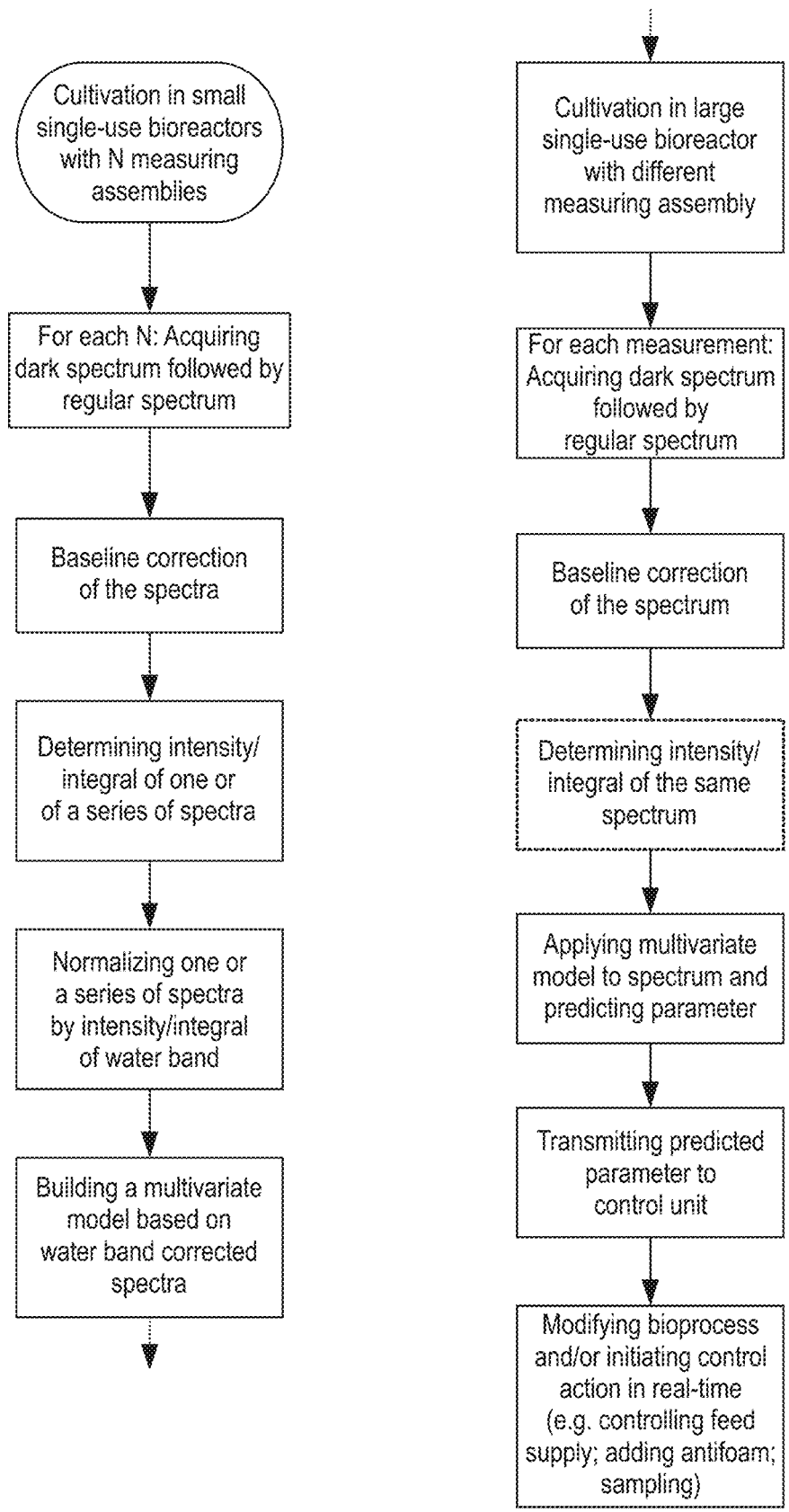
FIG. 1 shows a detailed flow chart of a method of controlling a bioprocess in accordance with the invention.
Figure 2:
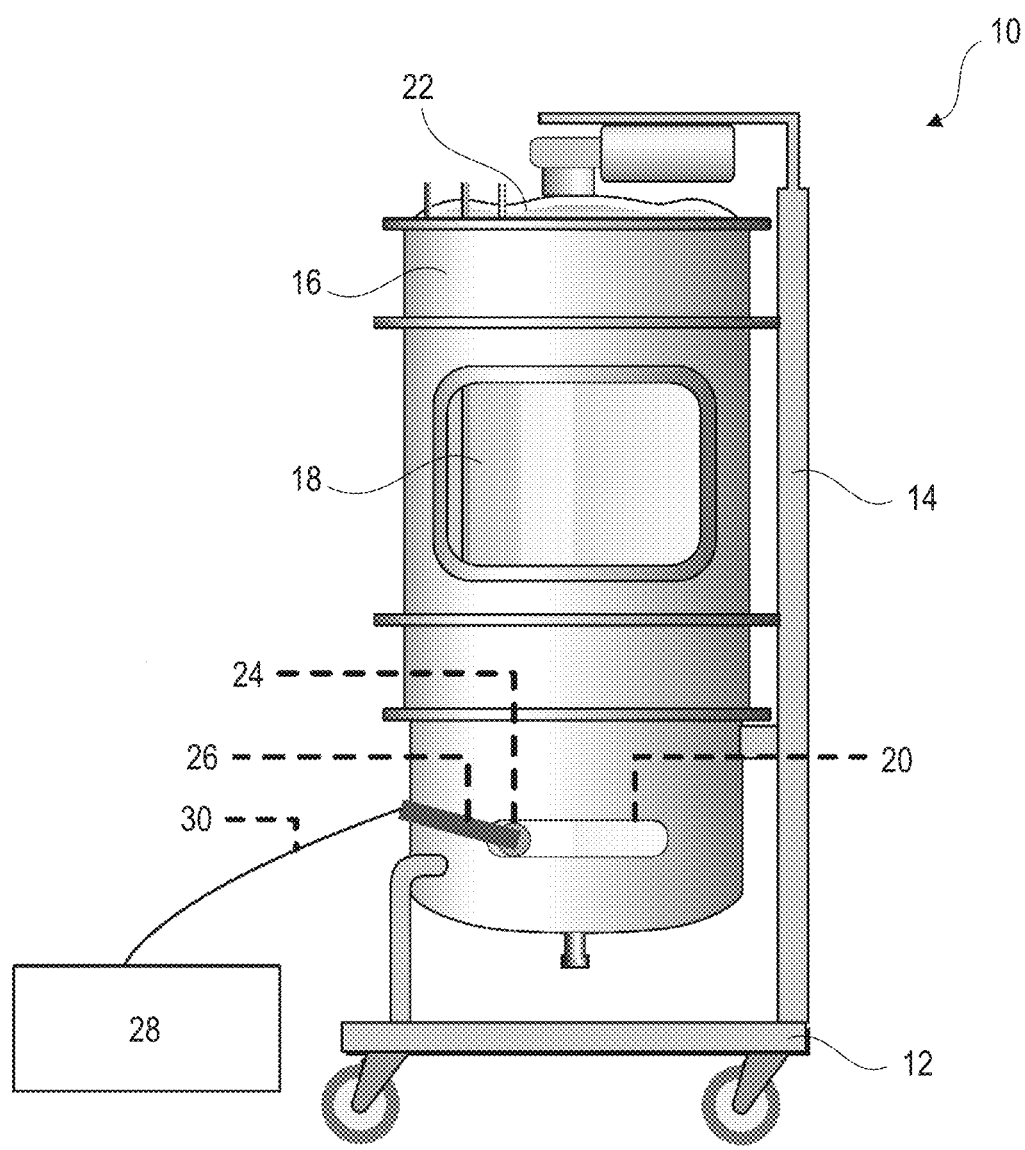
FIG. 2 shows a basic setup for acquiring Raman spectra in a bioprocess.

In the following, a typical use case of the invention, which is not to be understood in a limiting manner, is described with reference to the flow chart of FIG. 1 and the set-ups shown in FIGS. 2 and 3, before some example measurements and model applications are explained with reference to FIGS. 4 to 7.

It is assumed that a biopharmaceutical manufacturer (user) wants to control a large-scale manufacturing bioprocess and chooses Raman spectroscopy to be integrated. A robust model for quantitative prediction of a certain parameter (e.g. glucose concentration) requires a sufficient range of parameter variation, breaking of correlations between analytes and/or analytes and time, and coverage of all process variations occurring in the manufacturing bioprocess (e.g. a pH of 7 will not always be exactly 7, but may vary between 6.8 and 7.2). Such variations should be covered in the calibration data set.

It is to be noted that the required experiments for building a robust model in a preparatory phase cannot be done in manufacturing scale, at least not economically. For example, it is not easily possible to induce changes of parameter settings in large-scale. This would require a experimental design which is too costly. Therefore, it is more efficient for the user to develop the model in small-scale, in particular in a plurality of glass or single-use vessels, each having a capacity of up to 10 L, preferably below 5 L and optimal between 1 mL and 0.5 L.

To acquire the required calibration points in the most efficient manner, several cultivations in small-scale vessels are done in parallel. This is because automated multi-parallel microbioreactors are available which require less efforts compared to operating several individual bioreactors which involve more human interventions (e.g. feed, sampling etc.). In an ideal case, a number of up to 48 multi-parallel bioreactors are used which are fully automated, including automatic control of pH, dissolved oxygen (DO), feed addition, sampling, and temperature. An example of such a multi-parallel bioreactor set-up is the Ambr® cell culture microbioreactor system by The Automation Partnership (Cambridge) Ltd, UK.

As a first alternative, Raman spectra are acquired in each of the small-scale bioreactors. This means that a number of N (corresponding to the number of bioreactors) different "measuring assemblies" are used for measuring the Raman spectra. As mentioned before, the term "measuring assembly" is used for the individual set of hardware components which is used for acquiring a Raman spectrum of a medium in each bioreactor, usually including a spectrometer, a probe (head) or a flow cell, as well as any optical interfaces like a bioreactor spectroscopy port, an optical fiber etc. Although the N measuring assemblies for acquiring the Raman spectra may consist of similar components of the same type, in practice they cannot be absolutely identical on principle.

As a second alternative, samples are taken from each of the small-scale bioreactors and the samples are sequentially transferred to the same flow cell, followed by automated spectral acquisition. In this case, only one measuring assembly is used for acquiring the Raman spectra.

For the sake of simplicity, in the following it is assumed that the first alternative is used. However, the explanations referring to "each measuring assembly" may simply be transferred to the only measuring assembly if the second alternative is chosen.

The experimental set-up with the plurality of multi-parallel bioreactors covers expected process variations and/or induces variations to break correlations between analytes and/or analytes and time. Variations can be induced intentionally using a Design of Experiment (DoE) approach, i.e. variations are induced by design, not by coincidence, in order to cover expected variations in production with a minimum of preceding experiments.

In order to steadily correct variations of the ambient light properly, during the use of each measuring assembly "dark" Raman spectra (with the laser of the optical probe or the flow cell being switched off) are acquired repeatedly by each measuring assembly. It is to be noted that the dark current in a spectrochemical receptor strongly depends on the ambient light. Thus, the dark Raman spectra can be used to correct the "regular" Raman spectra (laser switched on) properly. If the intensity of the ambient light changes, as caused by switching off the light overnight, for example, then only a single Raman spectrum is faulty and the next one can be used to correct the influence of the ambient light properly again. Preferably, a dark Raman spectrum is acquired immediately before each acquisition of a regular Raman spectrum so that each regular Raman spectrum can be corrected optimally by the preceding dark Raman spectrum.

Apart from the above-described dark current correction (blanking), each acquired regular Raman spectrum undergoes a baseline correction using e.g. a method based on an Asymmetric Least Squares (ALS) algorithm, a rolling ball algorithm, a derivative of the curve of the acquired Raman spectrum or a scattering correction algorithm.

The thus corrected Raman spectra of the preparatory phase, hereinafter called "preparatory" Raman spectra, are normalized as will be described further below. After normalization, the baseline correction can be reversed. This allows for utilizing any common pretreatment without having to use baseline corrected Raman spectra.

According to a first approach, for normalizing a preparatory Raman spectrum the intensity and/or the integral of a characteristic water band, especially the water band at about $1640$ $cm^{-1}$, is determined from the very same Raman spectrum. Normalizing is performed by dividing the intensity at each wavelength by the intensity and/or the integral of the characteristic water band. This procedure is repeated for each preparatory Raman spectrum, i.e. each preparatory Raman spectrum is normalized separately using its own water band, respectively.

According to a second approach, for normalizing a series of preparatory Raman spectra acquired with the same measuring assembly, a statistical average of the characteristic water band, like a median or a mean value, is determined from a series of at least two Raman spectra acquired with the very same measuring assembly. Normalizing itself is performed as described above. With this approach it is possible to use only a single data set to normalize a series of preparatory Raman spectra at once. While this simplifies the normalization procedures, the results may be not as precise as with the first approach. Nevertheless, by determining and using the statistical average of the water band from more than one Raman spectrum, the normalization results are still of high quality since the noise of the water band is reduced.

After the water band normalization, the preparatory Raman spectra are automatically combined and/or aligned with reference data and bioreactor information. The fused data is used for building one or more multivariate prediction models.

The multivariate modelling may be based on quantitative algorithms, like Partial Least Squares (PLS) or Orthogonal Partial Least Squares (OPLS), and/or on qualitative algorithms, like Batch Evolution Models (BEM) or Batch Level Models (BLM) which, in turn, may be based on PLS, OPLS or principal component analysis (PCA).

Reference data is required for quantitative models. Qualitative models, which often use product parameters like product quality or titer (BLM), can be built with reference data. For BEM, batch maturity or batch age is often used, and therefore no additional reference measurement is required. Reference data can be acquired from at least one sample taken from one of the small-scale bioreactors (sampling). The reference measurement itself, i.e. an exact measurement of the parameter(s) using precise measurement tools, can be done directly after sampling, but also only hours or weeks later. The preparatory Raman spectrum acquired in the same bioreactor at the sampling time is then linked to the reference value(s) of the parameter(s).

Qualitative models can be built and later applied to reveal process trends (BEM) or are used to compare complete batches (BLM). Each Raman spectrum acquired in a later bioprocess is a fingerprint of the process time. The information derived from these Raman spectra (e.g. 3200 wavelengths) is condensed to a few score values per spectrum (BEM), or the information derived from all Raman spectra of one batch are condensed to a few score values (BLM). The score values can be plotted against batch maturity/time to illustrate the evolution of the batch processes over time (BEM), or the score values are evaluated to account for all data of completed batches in view of a target parameter like final titer (BLM).

Referring back to the use case, the at least one multivariate model built on the basis of the preparatory Raman spectra is to be applied in the large-scale manufacturing bioprocess of the user. For commercial production a bioreactor assembly 10, as shown by way of example in FIG. 2, can be used. The bioreactor assembly 10 includes a trolley 12 with a frame 14 carrying a stainless steel bag holder 16. The bag holder 16 has an upper glass window 18 and a lower cut-out, hereinafter called sensor access 20.

In the bag holder 16 a bag-type large-scale single-use bioreactor 22 is accommodated which is mainly formed from a flexible foil. The bioreactor 22 has a working volume of at least 10 L, a typical maximum working volume being in the range of 50 L to 5000 L. Currently preferred sizes are 50 L, 200 L, 500 L, 1000 L and 2000 L. The bioreactor 22 may have various openings, such as a top filler opening, an opening for a (pre-mounted) impeller shaft, or a lower drainage opening, which however are not important here.

The bioreactor 22 has an integrated single-use spectroscopy port 24 which is welded into the bag foil, for example. The spectroscopy port 24 provides an optical interface between the medium contained in the bioreactor 22 and an optical probe 26 attached directly or indirectly to the spectroscopy port 24. The optical probe 26 is connected to a spectrometer 28 via an optical fiber 30. The spectroscopy port 24, the optical probe 26, the optical fiber 30 and the spectrometer 28 form a measuring assembly for acquiring Raman spectra of the medium in the bioreactor 22.

The above described set-up is just one example of a commercial bioreactor assembly 10 including a certain measuring assembly. Other setups are possible, e.g. including measuring assemblies using an immersion probe, a flow cell or other hardware components or combinations. It is also possible that the measuring assembly is actually one of the N measuring assemblies used in the preparatory phase (first alternative with acquisition of Raman spectra in each small-scale bioreactor), or that the measuring assembly is the same as the only one used in the preparatory phase (second alternative with one flow cell), except for the single-use spectroscopy port 24. Since the spectroscopy port 24 is inherent in the large-scale single-use bioreactor 22, the measuring assembly used in the manufacturing bioprocess differs at least in this respect from the measuring assembly or assemblies used in the preparatory phase.

It is further to be noted that the manufacturing bioprocess discussed here is typically not a continuous process but a batch process, a fed-batch process or a quasi-continuous perfusion process. Accordingly, the single-use bioreactor 22 is replaced with a new one after each batch or after a certain time, and thus the spectroscopy port 24, which is part of the measuring assembly, changes with each bag that is used.

The Raman spectra acquired during the manufacturing bioprocess are subject to dark current and baseline corrections in the same way as the preparatory Raman spectra were corrected before.

The Raman spectra acquired and corrected during the manufacturing bioprocess are called "predictive" Raman spectra as they are used to predict one or more parameters of the medium in the bioreactor 22, e.g. glucose concentration, in real-time.

Before it is used for such a prediction, a predictive Raman spectrum undergoes a water band correction which is performed generally in the same manner as with the preparatory Raman spectra:

According to the first approach, for normalizing a predictive Raman spectrum the intensity and/or the integral of a characteristic water band, especially the water band at about 1640 cm$^{-1}$, is determined from the very same Raman spectrum. Normalizing is performed by dividing the intensity at each wavelength by the intensity and/or the integral of the characteristic water band. This procedure is applied to each predictive Raman spectrum, i.e. each predictive Raman spectrum is normalized separately using its own water band.

According to the second approach, for normalizing the predictive Raman spectra either a single water band is determined from a Raman spectrum acquired before (e.g. at the beginning of the batch) with the very same measuring assembly, or a statistical average of the characteristic water band, like a median or a mean value, is determined from a series of at least two Raman spectra acquired before with the very same measuring assembly. Normalizing itself is performed as described above. With this approach it is possible to use only a single data set to normalize all preparatory Raman spectra of one batch.

It is generally possible to update the multivariate model built on the basis of the preparatory Raman spectra with data of one or more of the predictive Raman spectra and corresponding reference values. In particular, the data acquired with the multi-parallel bioreactor set-up can be supplemented by and adapted to the data acquired with the commercial bioreactor assembly 10, i.e. data sets relating to predictive Raman spectra acquired during one or a few or all of the batches of the manufacturing bioprocess. For example, the predictive Raman spectra can be added at the time of a daily sampling, including the corresponding reference analysis.

The (updated) multivariate model is applied to the predictive Raman spectra in order to derive the desired information about the parameter. The multivariate model actually provides a calculation rule for the desired determination of the parameter (prediction). The parameter can be quantitative, such as concentration of glucose, lactates, ammonia, glutamine or other amino acids, glutamate, glycosylation forms etc. It is also possible to determine qualitative parameters, such as the score values explained above.

Based on the information derived from the predictive Raman spectra, the manufacturing bioprocess is controlled in real-time as will be explained further below.

Figure 3:
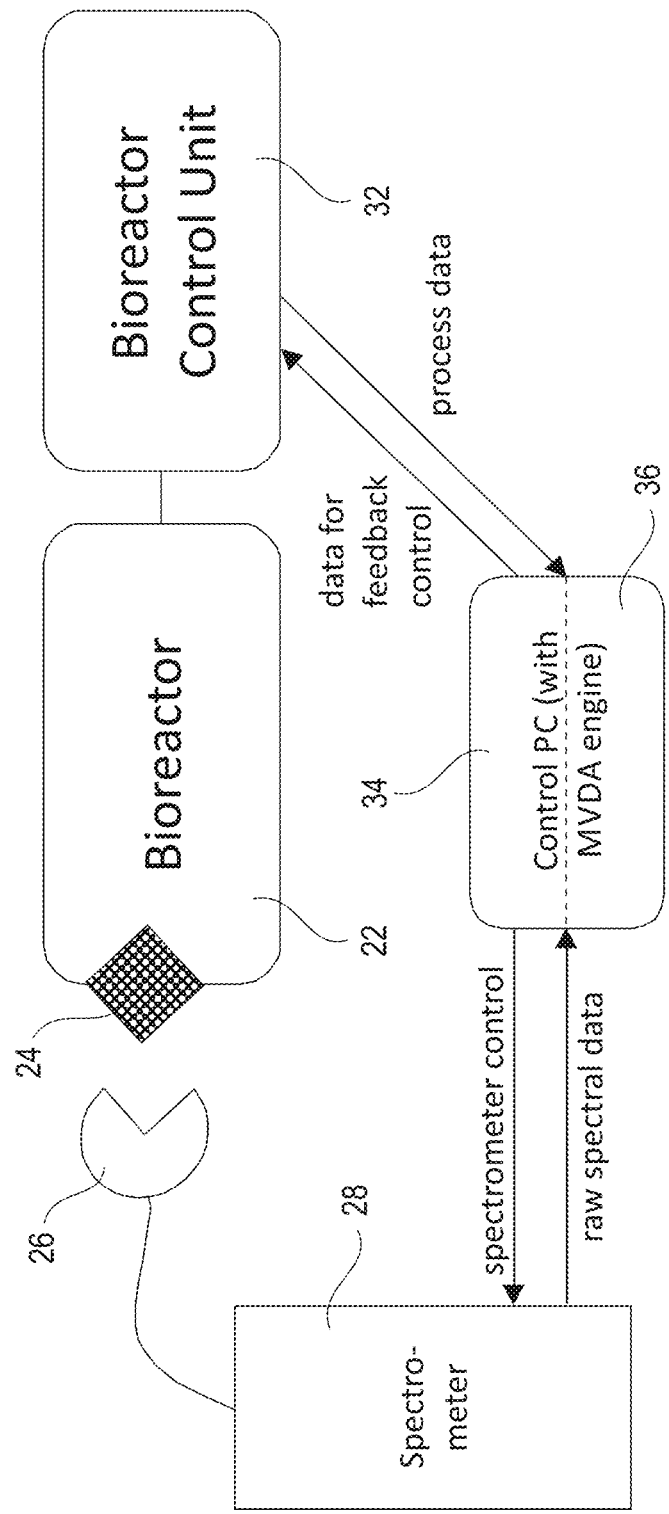
FIG. 3 shows a schematic block diagram of hardware and software components used in the method of controlling a bioprocess according to the invention.

FIG. 3 shows a schematic example of how the Raman spectroscopy information can be obtained, processed and applied in a bioprocess. The hardware and software components include—apart from the already mentioned single-use bioreactor 22 with the integrated spectroscopy port 24, the optical probe 26 and the spectrometer 28—a control unit 32, a control software module 34 for controlling the spectrometer 28 and a Multivariate Data Analysis (MVDA) software module 36 for model building and application.

The control unit 32, which can be a Supervisory Control And Data Acquisition (SCADA) based automation system or a bioreactor automation platform like the BioPat® DCU digital control unit by Sartorius Stedim Biotech GmbH, Germany, controls physical interactions of the bioprocess equipment including valves, pumps, etc. The software of the control unit 32 includes the so-called recipe structure (workflows) that guides the automation system or platform. Further, the control unit 32 transmits certain process data to the MVDA software module 36, including any reference data, bioreactor ID, batch ID, quality data, etc.

The control software module 34 controls the spectrometer 28 and initiates the measurements to acquire the Raman spectra of the medium contained in the bioreactor 22. In turn, the MVDA software module 36 receives the raw spectral data from the spectrometer 28 and is capable of building a multivariate model based on the spectral data and the process data, as explained above, and applying the model in real-time.

In general, by applying the multivariate model to a later acquired Raman spectrum, e.g. a Raman spectrum of a manufacturing bioprocess, it is possible to predict the parameter. It is also possible that the model is not based on preparatory experiments as explained in the use case discussed above, but on a previous (completed) bioprocess or on a certain batch of a running bioprocess. This means that the model is built on preparatory Raman spectra acquired from the previous bioprocess or a preceding batch, respectively. The model is then applied to a following bioprocess or batch.

In any event, due to the water band normalization of the preparatory and predictive Raman spectra, any variations in the prediction caused by the use of different measuring assemblies is largely eliminated.

Based on the prediction of the parameter, the control unit 32 may suggest modification of the predicted parameter and/or of one or more process parameters of the running bioprocess. The control unit 32 may also initiate a control action. In case of a (semi-)automated process control, the control unit 32 is adapted to directly modify process parameters and/or initiate control actions without any or with reduced interaction of operating personnel. Examples of control actions are controlling a feed supply, adding an antifoam, and taking a sample for further inspection (sampling).

In the depicted example, the control unit 32 expects the data for feedback control from the MVDA software module 36 as univariate data (although it can still contain multiple parameters). Therefore, MVDA software module 36 is capable of calculating univariate data outputs from multivariate data input parameters.

Instead of using appropriate software interfaces for transfer of information, one or both of the software modules 34, 36 can be integrated into the immanent software of the spectrometer 28 or the control unit 32, for example. Furthermore, the control unit 32 and/or the spectrometer control software can be connected to a data historian.

As explained above, the method of predicting a parameter of a medium to be observed in a bioprocess described above is superior to hitherto known methods. This will be demonstrated by means of a practical example with reference to the diagrams and prediction plots of FIGS. 4 to 7.

Figure 4:
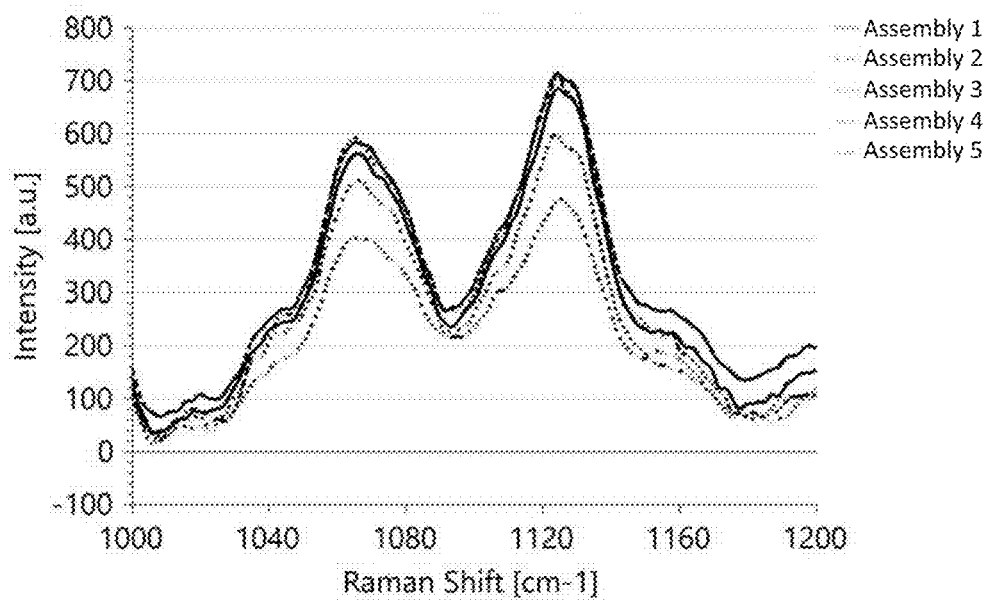
FIG. 4 shows Raman spectra of several glucose samples acquired with different probe heads and process interfaces and corrected by a prior art method.

The diagram of FIG. 4 is an excerpt of baseline corrected Raman spectra of one example of a series of several glucose solutions (here: 7.5 g/L) acquired by five different measuring assemblies, in particular with different optical probe heads and optical interfaces (flow cell, bioreactor spectroscopy port). The Raman spectra show the glucose bands between a wavenumber measuring range of 1000 and 1200 $cm^{-1}$. It can be seen that there is quite some scattering depending on the probe head, and especially at higher concentrations, peaks do not lie on top of each other. Differences occur as the sensitivity of each probe head/interface combination varies. In particular, less sensitive probe head/interface combinations show weaker glucose signals. In the same way and magnitude the characteristic water band at about 1640 $cm^{-1}$ (not shown) is reduced. In other words: the water band signal correlates with the glucose signal. Under the assumption that the water concentration in the medium is always similar, it can be concluded that normalizing the Raman spectra based on the characteristic water band would reduce the variation of the glucose band of the different setups.

Figure 5:
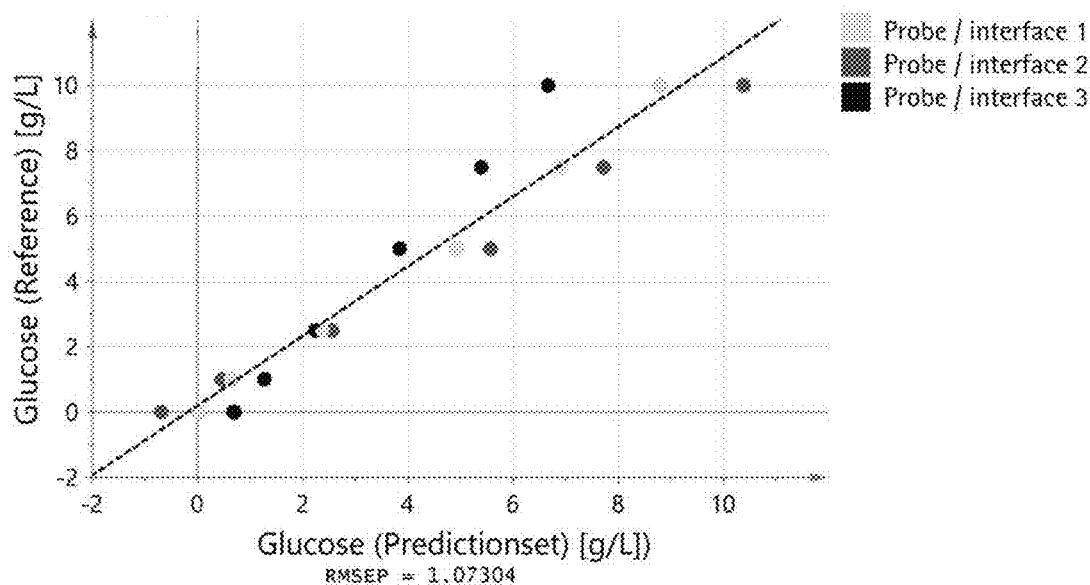
FIG. 5 shows a prediction plot of glucose concentrations for different probe/interface combinations based on a correction method according to the prior art.

FIG. 5 shows a prediction plot of glucose concentrations (reference glucose vs. prediction of glucose). A built model of glucose concentration with a certain probe/interface is compared to similar measurements with other probe heads/interfaces. Again, the different sensitivities of the probe head/interface combinations cause a variation of the slope and therefore higher deviation from the model. The probe/interface combination of the first series (light grey) has a sensitivity close to the one that was used for model building. The second series (medium grey) is less, the third series (black) more sensitive to increasing glucose concentrations.

Figure 6:
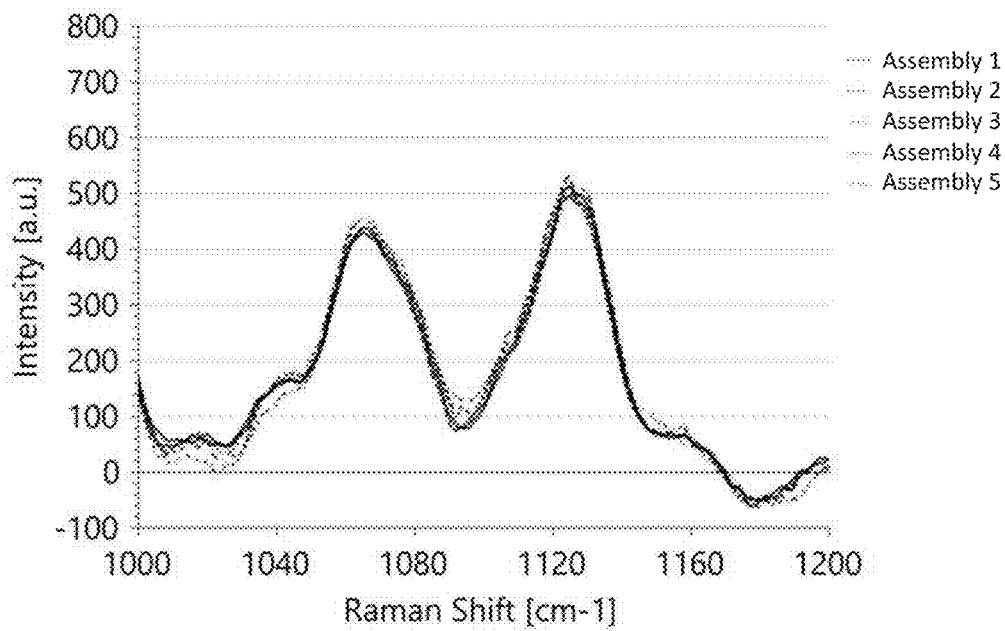
FIG. 6 shows the Raman spectra of FIG. 4 corrected by a method according to the invention.

FIG. 6 shows the Raman spectra of FIG. 4 after a normalization based on the characteristic water band at about 1640 $cm^{-1}$ in accordance with the invention. All Raman spectra fall well on top of each other. This is because the probe/interface variations affect the water band in the same way as the bands of the analyte in the acquired spectra, and after normalizing the acquired spectra using the characteristic water band the differences in sensitivity are largely eliminated.

Figure 7:
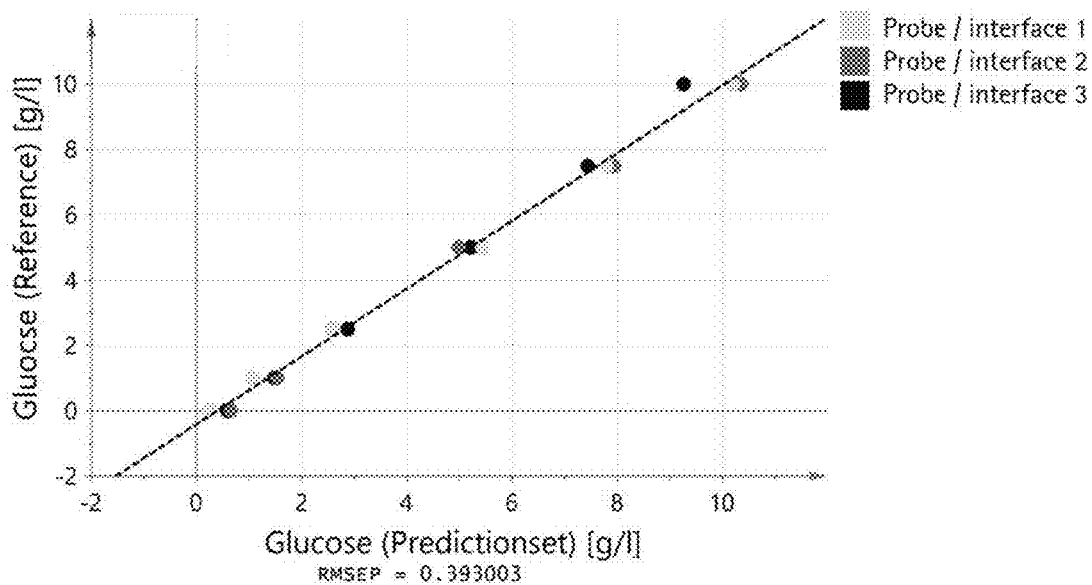
FIG. 7 shows the prediction plot of FIG. 5 based on a correction by a method according to the invention.

FIG. 7 depicts the same diagram as FIG. 5, but based on Raman spectra that were water band corrected in accordance with the invention. Probe/interface differences are well compensated and the slope of the prediction fits perfectly to the model which was also built with water band corrected Raman spectra.

Thus, the correction technique according to the invention provides a better correction of Raman signals in bioprocess monitoring with regard to differences in the hardware used for the measurements (measuring assemblies), in particular differences in the probes, but also concerning variations of the sensitivity when different combinations of spectrometers, probes, flow cells, single-use spectroscopy ports etc. are used.

LIST OF REFERENCE SIGNS 10 bioreactor assembly
12 trolley
14 frame
16 bag holder
18 glass window
20 sensor access
22 bioreactor
24 spectroscopy port
26 optical probe
28 spectrometer
30 optical fiber
32 control unit
34 control software module
36 MVDA software module

The invention claimed is:

1. A method of predicting a parameter of a medium to be observed in a bioprocess based on Raman spectroscopy, the method comprising the steps of:
   acquiring a first series of preparatory Raman spectra of an aqueous medium using a first measuring assembly;
   normalizing the first series of preparatory Raman spectra based on a characteristic band of water from at least one Raman spectrum acquired with the first measuring assembly;
   building a multivariate model for the parameter based on the normalized preparatory Raman spectra;
   acquiring predictive Raman spectra of the medium to be observed during the bioprocess acquired with another measuring assembly;
   normalizing the predictive Raman spectra based on a characteristic band of water from at least one Raman spectrum acquired with the other measuring assembly; and
   applying the built model to the predictive Raman spectra for predicting the parameter.

2. The method according to claim 1, wherein the characteristic water band at about 1640 $cm^{-1}$ is used for normalizing.

3. The method according to claim 1, wherein a peak value (intensity) of the characteristic water band is used for normalizing.

4. The method according to claim 1, wherein a peak area (integral) of the characteristic water band is used for normalizing.

5. The method according to claim 1, further comprising the steps of
acquiring at least a second series of preparatory Raman spectra of an aqueous medium using a second measuring assembly; and
normalizing the second series of preparatory Raman spectra based on the characteristic band of water from at least one Raman spectrum acquired with the second measuring assembly;
wherein the step of building a multivariate model for the parameter is based on the normalized first and second series of preparatory Raman spectra.

6. The method according to claim 1, wherein each of the preparatory and/or predictive Raman spectra is normalized using the characteristic water band from the very same Raman spectrum.

7. The method according to claim 1 wherein each spectrum of at least one of a series of preparatory and predictive Raman spectra acquired with one measuring assembly is normalized using a statistical average.

8. The method according to claim 1 wherein the predictive Raman spectra of the medium to be observed during the bioprocess are acquired using a measuring assembly different from the measuring assemblies used for acquiring the preparatory Raman spectra.

9. The method according to claim 1 wherein the preparatory Raman spectra are acquired in one or more small-scale bioreactors.

10. The method according to claim 1, wherein the predictive Raman spectra are acquired in a large-scale bioreactor.

11. The method according to claim 1 wherein for building a quantitative model a sample of the aqueous medium is taken, a sample reference measurement of the parameter is performed, and at least one of the preparatory Raman spectra is linked to the sample reference measurement.

12. The method according to claim 1 wherein for building a qualitative model a statistical value from the preparatory Raman spectra is derived.

13. A device assembly for predicting a parameter of a medium to be observed in a bioprocess, the device assembly being adapted to carry out a method according to claim 1.

14. The device assembly according to claim 13, comprising a plurality of small-scale bioreactors containing aqueous media from which the preparatory Raman spectra are acquired.

15. The device assembly according to claim 14, wherein each small-scale bioreactor is associated with an individual measuring assembly for acquiring the preparatory Raman spectra.

16. The device assembly according to claim 15, wherein each small-scale bioreactor is connectable to a single measuring assembly for acquiring the preparatory Raman spectra.

17. The device assembly according to claim 13, comprising a large-scale single-use bioreactor having an inherent spectroscopy port for acquiring the predictive Raman spectra.

18. The device assembly according to claim 13, comprising a Multivariate Data Analysis software module for building the multivariate model and applying the multivariate model in real-time.

19. The device assembly according to claim 1, wherein a control software module for controlling a spectrometer of the measuring assembly used for acquiring the predictive Raman spectra during the bioprocess.

20. A method of controlling a bioprocess, comprising the steps of:
predicting a parameter of a medium to be observed in the bioprocess by the method according to claim 1;
modifying at least one process parameter of the bioprocess based on the prediction in real-time; and/or
initiating a control action based on the prediction in real-time.

21. The method according to claim 20, wherein the initiated control action includes one of controlling a feed supply; adding an antifoam; or sampling.

22. A device assembly for controlling a bioprocess, the device assembly being adapted to carry out the method according to claim 20.

23. The device assembly according to claim 22, comprising:
a device assembly for predicting a parameter of a medium to be observed in a bioprocess, the device assembly being adapted to carry out a method comprising:
acquiring a first series of preparatory Raman spectra of an aqueous medium using a first measuring assembly;
normalizing the first series of preparatory Raman spectra based on a characteristic band of water from at least one Raman spectrum acquired with the first measuring assembly;
building a multivariate model for the parameter based on the normalized preparatory Raman spectra;
acquiring predictive Raman spectra of the medium to be observed during the bioprocess acquired with another measuring assembly;
normalizing the predictive Raman spectra based on a characteristic band of water from at least one Raman spectrum acquired with the other measuring assembly; and
applying the built model to the predictive Raman spectra for predicting the parameter; and
a control unit connected to the control software module and the Multivariate Data Analysis software module;
the control unit being adapted to modify at least one process parameter of the bioprocess based on the prediction in real time and/or to initiate a control action based on the prediction in real time.

24. The method according to claim 9 wherein the small-scale bioreactors are arranged in a multi-parallel set-up.

25. The method of claim 11 wherein the at least one preparatory Raman spectra is acquired at the same time as the sample was taken.

26. The method of claim 12 wherein the derived statistical value is a particular scored value from a principal component analysis (PCA) or an (orthogonal) partial least squares ((O)PLS) regression.

27. The method of claim 14 wherein the small scale reactores are arranged in a multi-parallel set-up.

28. The method according to claim 7, wherein the statistical average is a median or a mean value of the characteristic water band derived from the same or another series of Raman spectra acquired with the same measuring assembly.

29. The method according to claim 10, wherein the large-scale bioreactor is a single-use bioreactor having an inherent spectroscopy.

\* \* \* \* \*